United States Patent Office 3,341,410
Patented Sept. 12, 1967

3,341,410
METHOD OF PROMOTING EPITHELIALIZATION WITH TOPICAL NON-AQUEOUS ACID ANHYDRIDE COMPOSITIONS
Irving L. Ochs, Anne Arundel County, Md., assignor of one-half to Preston L. Veltman
No Drawing. Filed Mar. 16, 1965, Ser. No. 440,274
29 Claims. (Cl. 167—58)

This invention relates to non-aqueous compositions therapeutically useful for treating a variety of infections and potentially infected wounds of epithelial and other tissues.

Among the objects to the present invention are non-aqueous compositions which provide one or more therapeutically useful materials by reaction with water at the aqueous interface of topical application.

Further objects include compositions comprising, at least in part, of mixed anhydrides of normally toxic or caustic acid materials as therapeutically useful materials.

Still further objects and advantages of the present invention will appear from the more detailed description set forth below, it being understood that such more detailed description is given by way of illustration and explanation only, and not by way of limitation since various changes therein may be made by those skilled in the art without departing from the scope and spirit of this invention.

In accordance with the present invention, it has been found possible to make and use mixed acid anhydrides in topical compositions to provide therapeutically useful medicament agents. These compositions are thus suitable for use where healing is the desired objective.

An earlier application, U.S. Ser. 366,631, now Patent 2,788,308, teaches the use of acetic anhydride and glacial acetic acid, or mixtures thereof in compositions designed to control the concentration of hydrous acetic acid produced at the interface of topical application. The active therapeutic agent of U.S. Patent 2,788,308 is aqueous acetic acid, and the means and mechanisms there disclosed are directed towards compositions effective in providing therapeutic concentrations over a wide range of conditions.

It has now been discovered that a number of mixed acid anhydrides exhibit desirable properties for therapeutic application, said effectiveness being due to the simultaneous presence of both acidic materials at the boundary of hydrous and anhydrous media.

For instance, the reaction between acetyl chloride and sodium benzoate produces the mixed acid anhydride of acetic and benzoic acids. When separated from the co-produced sodium chloride this material is a solid at room temperature, but melts at aproximately body temperature and slowly hydrolyzes in the presence of moisture to produce benzoic and acetic acids, both of which have therapeutic value. The hydrolysis rate is slow and the mixed anhydride exhibits none of the normally caustic qualities of, say, acetic anhydride. Similarly, acetyl chloride reacts with sodium stearate to give the mixed anhydride of acetic acid and stearic acid, which melts at about body temperature and hydrolyzes slowly to produce a mixture of acetic and stearic acids. As will be shown herein, a wide range of these mixed acid anhydrides have been prepared to illustrate the control of therapeutic effectiveness obtainable by various combinations.

Compositions described herein are not necessarily meant to be used in the pure state but also when combined with vehicle materials, substantially non-reactive to the mixed anhydrides and of such a physical and chemical nature as to not interfere with the healing process. The non-reactive vehicle medium serves to control the rate of delivery of the active component to the aqueous wound surface. The medium serves as a reservoir for the anhydride components and permits its slow diffusion to the aqueous interface. For instance, various grades of petrolatum may be employed. A relatively low viscosity, oily, material may be used if one desires a fluid or semi-fluid mass. However, if a more solid mass is desired, a highly viscous petrolatum may be employed.

Petrolatum is used to describe a refined petroleum material having the general formula $C_nH_{2n+2}$. These materials have melting points in the range of 38 to 54 degrees centigrade, and are sometimes called "parafin jellies." Specific fractions may be more suitable for a desired application than others. For instance, if a less fluid composition is desired, a higher melting point petrolatum is used as a vehicle. Silicone oils of viscosities varying from thin liquids to heavy greases are useful as components of therapeutic compositions here described.

It is not meant to here limit the main vehicle material for the mixed acid anhydrides to petrolatum types, or to be limited in the ways of incorporating the mixed acid anhydrides in the substantially non-aqueous vehicle. Glyceride oils have been used, particularly olive, corn, and peanut. These vegetable oils are the glycerides or polymetic, stearic, oleic, arachidic, hypogalic, lignoceric, linoleic, and the like, and are particularly suited for use desirably with other substantially anhydrous oils to hold the mixed anhydride compositions of this invention for therapeutic purposes. There is no intent here to limit the vehicle, except that it must be substantially non-reactive to the mixed acid anhydrides.

The polyethylene glycols known as "Carbowaxes" seem to be substantially non-reactive to relatively high molecular weight mixed acid anhydrides, particularly at room temperature. They are thus useful as vehicles. The term "Carbowax" is used to describe compounds of the dihydroxy-ether type, having the general formula

$$HOCH_2(CH_2OCH_2)_nCH_2OH$$

They vary in degree of solidness and hygroscopicity, and are broadly used for compounding topical medicaments.

Propylene glycol is reactive to acid anhydrides, particularly at elevated temperature, but is substantially non-reactive to the higher molecular weight mixed acid anhydrides of this invention at or below body temperature. Thus, propylene glycol can be used in those cases where its particular desirable medicament properties are sought.

Various materials may be used in conjunction with the mixed acid anhydrides of this invention to influence the physical nature of the resultant masses, and to improve utility for a particular purpose. The only fundamental requirement of the substantially non-aqueous base composition is that it be substantially non-reactive to the mixed acid anhydride and be capable of holding the medicaments in uniform solution or suspension so that the therapeutic agents can diffuse to the interface where therapeutic action is desired. The ultimate composition employed may be of any desired consistency, as liquid, unctuous, solid, etc. The application may also be made in aerosol types of compositions for application in body cavities by spray transfer of active ingredients to the wound.

The ranges of proportions of components depends upon the nature of the specific composition, the solvent and other components, their ratios, and the conditions under which the composition is to be used. Various considerations bearing on the question of proportions are given in the examples.

U.S. Patent 2,726,982 is concerned with the use of hydrous aqueous acetic acid as a topical medicament. It is found that a maximum of approximately 4% aqueous acetic acid can be tolerated in contact with a wound to inhibit bacterial growth, while still permitting epithelial growth. In U.S. Patent 2,788,308, teaching substantially anhydrous acetic acid producing compositions, a maximum of approximately 10% acetic anhydride was employed successfully, with 20% compositions shown not unreasonable, provided they were contained in a sufficiently slow diffusing system. The compositions of this invention do not depend solely on rate of diffusion for controlling medicament concentration at the interface, but also derive desirable qualities from the dual nature of the molecule itself. Some mixed acid anhydrides are therapeutically effective as pure materials. The following examples illustrate the preparation and use of objects of this invention, parts being by weight unless otherwise indicated.

EXAMPLE I

Seventy-four grams of chemically pure propionic acid was reacted with an aqueous solution containing 40 grams of sodium hydroxide dissolved in 200 grams of water. The aqueous solution was evaporated to dryness and held at 220° F. overnight, to attain 95 grams sodium propionate. The sodium propionate powder was added to 78 grams of acetyl chloride dissolved in 400 cc. of chloroform. After one hour under reflux the reaction was complete. The solid sodium chloride was filtered off and washed with 200 cc. of chloroform. The dry solid sodium chloride weighed 55 grams, indicating a 95% of theory yield. The chloroform was evaporated leaving 112 grams of the mixed acid anhydride product of propionic and acetic acids. The indicated yield was 97% of theory.

A composition comprising 5 grams of the propionic-acetic acid anhydride and 95 grams of peanut oil is an effective topical agent for therapeutic use.

EXAMPLE II

One hundred thirty grams of commercial heptanoic acid was reacted with 40 grams of sodium hydroxide dissolved in 200 cc. of water. The reaction product was dried overnight at 220° F. to produce 150 grams of sodium heptanoate. The sodium heptanoate was reacted with 78 grams of acetyl chloride dissolved in 400 cc. of chloroform under reflux for one hour with stirring. The sodium chloride produced was filtered off and washed with 200 cc. of chloroform. After drying, the sodium chloride weighed 54 grams, indicating a yield of 93%. The chloroform was evaporated under vacuum and mild heating to produce 165 grams of the mixed anhydride indicating a yield of 96%.

A composition comprising 10 grams of the heptanoic-acetic acid anhydride in 90 grams of petrolatum is an effective therapeutic agent.

EXAMPLE III

One hundred forty four grams of reagent grade octanoic acid was reacted with 40 grams of sodium hydroxide dissolved in 200 cc. of water. The reaction product was dried to constant weight at 220° F., producing 166 grams of sodium octanoate. The pulverized sodium octanoate was reacted with 78 grams of acetyl chloride dissolved in 400 cc. of chloroform. The reacting mixture was stirred for one hour under reflux. The sodium chloride was then filtered off and washed with 200 cc. of chloroform. After drying, the sodium chloride weighed 56 grams, indicating a theoretical yield of 97%. The accumulated filtrate was evaporated under vacuum to constant weight to produce 180 grams of the octanoic-acetic acid mixed anhydride, indicating a yield of 96% of theoretical.

A composition comprising 10 grams of the octanoic-acetic acid anhydride in 80 grams of Carbowax 1540, to which is added 10 grams of para-wax to make the composition less fluid at body temperatures, has effective topical therapeutic utility.

EXAMPLE IV

One hundred fifty eight grams of nonoic acid was reacted with 40 grams of sodium hydroxide dissolved in 200 cc. of water. The reaction product was dried to constant weight at 220° F. to produce 180 grams of sodium nonoate. One hundred eighty grams of sodium nonoate was added to a solution of 78 grams of acetyl chloride dissolved in 400 cc. of chloroform. The mixture was allowed to react for one hour with stirring at reflux temperature of the chlorofrom. The sodium chloride was then filtered off, washed with approximately 400 cc. of chloroform, and dried. The sodium chloride yield was 55 grams, indicating a theoretical yield of 94%. The combined filtrates were subjected to evaporation under vacuum to produce 190 grams of the mixed anhydride of nonoic and acetic acids. A yield of 95% of theory was obtained.

A homogeneous composition, comprising 5 grams of the nonoic-acetic acid anhydride in 10 grams of glyceride oil and 85 grams of petrolatum, is an effective antibacterial topical medicant.

EXAMPLE V

Two hundred eighty four grams of technically pure stearic acid was reacted with 40 grams of sodium hydroxide dissolved in 200 cc. of water. The reaction mixture was dried to constant weight at 220° F. to produce 304 grams of sodium stearate. The sodium stearate was added to a solution of 78 grams of acetyl chloride in 400 cc. of chloroform. The mixture was allowed to react for one hour at reflux, with stirring. The sodium chloride was filtered off and washed with 200 cc. of chloroform. After drying, the sodium chloride yield was 53 grams, indicating a 92% theory. After evaporation of the chloroform, 320 grams of the mixed anhydride of stearic and acetic acid was obtained, indicating a yield of 98% of theory.

The stearic acid-acetic acid anhydride melts at about body temperature and is an effective anti-bacterial agent. Compounded with non-reactive vehicles, it effectively controls infection, thereby promoting healing.

EXAMPLE VI

One hundred eighty four grams of technical undecylenic acid and 40 grams of sodium hydroxide dissolved in 200 cc. of water were reacted, and dried overnight to constant weight. Two hundred four grams of the sodium salt of undecylenic acid was produced. The sodium undecylenate was added with stirring to 78 grams of acetyl chloride contained in 400 cc. of chloroform. The reaction was complete in less than one hour under the reflux temperature of chloroform. The sodium chloride recovered weighed 55 grams, indicating a theoretical yield of 95%. After evaporation of the chloroform under vacuum, 210 grams of the mixed anhydride of undecylenic acid and acetic acid was recovered, indicating a theoretical yield of 93%.

A composition comprising 10 grams of the undecylenic-acetic acid anhydride in 80 grams of Carbowax 4000 with 10 grams of peanut oil is an effective agent for treating infections.

EXAMPLE VII

One hundred eighty four grams of technical undecylenic acid was reacted with 40 grams of sodium hydroxide in 200 cc. of water. After evaporation to dryness, 204 grams of sodium undecylenate was produced. The sodium undecylenate was added to 92 grams of propionyl chloride dissolved in 400 cc. of chloroform. The reaction was complete after stirring under reflux for one hour. The sodium chloride was filtered off and washed with 200 cc. of chloroform. Fifty-three grams of sodium chloride was recovered, indicating a 91% yield. After evaporation of the chloroform, 219 grams of the undecylenate was recovered, indicating that a 97% yield of the undecylenic-propionic acid mixed anhydride was produced.

A composition comprising 20 grams of the undecylenic-propionic acid anhydride in 80 grams of silicone oil is effective for topical applicaton.

EXAMPLE VIII

One hundred thirty-eight grams of chemically pure salicylic acid was reacted with 40 grams of sodium hydroxide dissolved in 200 cc. of water. The reaction product was dried to constant weight at 220° F., producing 160 grams of sodium salicylate. The 160 grams of sodium salicylate was powdered and added to 78 grams of acetyl chloride dissolved in 400 cc. of chloroform. After allowing the mix to reflux for one hour with stirring, the sodium chloride was filtered off and washed with 400 cc. of chloroform. The dried recovered sodium chloride weighed 55 grams, indicating a yield of 95% of theory. After evaporation of the chloroform, 170 grams of the mixed anhydride of salicylic and acetic acids was obtained, indicating a yield of 95% of theory.

An effective topical composition is prepared by dissolving 10 grams of the salicylic-acetic acid anhydride in 90 grams of soft petrolatum.

EXAMPLE IX

One mol of sodium salicylate (160 grams) was reacted with one mol of propionyl chloride (92 grams) in 400 cc. of chloroform. After reflux for one hour with stirring, the sodium chloride was filtered off and washed with 200 cc. of chloroform. The dried sodium chloride weighed 53 grams, indicating a yield of 91% of theory. The chloroform was evaporated under vacuum, and a yield of 186 grams of the salicylic-propionic acid anhydride obtained, indicating a theoretical yield of 96%.

Five parts salicylic-propionic acid mixed anhydride, blended with 95 parts peanut oil, is therapeutically effective.

EXAMPLE X

One mole of benzoyl chloride (140 grams), Reagent grade, was dissolved in 400 cc. of diethyl ether and reacted with one mol of sodium undecylenate under reflux for one hour, with stirring. The sodium chloride produced was filtered off and washed with 400 cc. of diethyl ether. Fifty grams of dry sodium chloride was obtained, indicating a yield of 86% of theory. After evaporation of the diethyl ether, 275 grams of the mixed anhydride of benzoic and undecylenic acid was obtained, indicating a yield of 95%.

The benzoic-undecylenic acid mixed anhydride is a waxy solid at room temperature, and is an effective topical anti-bacterial and fungistatic agent. It can be used as a pure material, or it may be compounded with adjuvant vehicles in various concentrations to obtain desired physical characteristics for topical application.

EXAMPLE XI

One mol of benzoyl chloride, Reagent grade, (140 grams), was reacted with stirring in 400 cc. of diethyl ether with one mol of CP-sodium acetate (82 grams). After one hour under solvent reflux, the sodium chloride was filtered off and washed with 200 cc. of diethyl ether. The dried sodium chloride weighed 55 grams, indicating a yield of 95%. After evaporation of the diethyl ether, 160 grams of mixed anhydride product was obtained, indicating a yield of 98% of theory.

The benzoic-acetic acid anhydride material is a waxy solid that melts at about body temperature. As a pure material, it is topically effective for control of infection, or it may be compounded with other agents, such as 10 grams of the mixed anhydride in 90 grams of a glyceride oil for topical use.

EXAMPLE XII

One mol of para amino benzoic acid, Reagent grade, (137 grams) was reacted with 40 grams of sodium hydroxide dissolved in 400 cc. of water. The reaction mixture was dried to constant weight under vacuum at approximately 100° C. The reaction product weighed 157 grams (the sodium salt of para amino benzoic acid) and this was reacted with one mol of acetyl chloride (79 grams) dissolved in 400 cc. of diethyl ether. After one hour reaction with stirring under the reflux temperature of ether, the sodium chloride was filtered off and washed with 200 cc. of diethyl ether. The recovered sodium chloride weighed 54 grams, indicating a theoretical yield of 93%. The mixed acid anhydride product weighed 170 grams, indicating a theoretical yield of 95%.

Five grams of the para amino benzoic acid mixed anhydride with acetic acid, dispersed in 95 grams of petrolatum, is an effective topical medicant.

EXAMPLE XIII

One mol (180 grams) of chemically pure acetylsalicylic acid was reacted with stirring with one mol (40 grams) of sodium hydroxide dissolved in 500 cc. of absolute ethyl alcohol. The reaction mix was stirred under solvent reflux for one hour. The reaction product was then dried under vacuum to constant weight, producing 198 grams of sodium acetylsalicylate. The sodium acetylsalicylate was slowly added to one mol of acetyl chloride dissolved in 500 cc. of chloroform and allowed to react for one hour with stirring under solvent reflux. A fine precipitate of sodium chloride was formed. This was filtered off and washed with 400 cc. of chloroform. The recovered dried sodium chloride weighed 52 grams, indicating a yield of 90%. The mixed acid anhydride produced weighed 210 grams, indicating a theoretical yield of 94%.

The acetylsalicylic-acetic acid mixed anhydride is a waxy solid, and a topically effective therapeutic composition contains five grams of this material dissolved in 95 grams of a glyceride oil.

EXAMPLE XIV

Two hundred grams of sodium acetylsalicylate was reacted with one mol of propionyl chloride dissolved in 500 cc. of chloroform. After the reaction was complete, the sodium chloride was filtered off and washed with additional chloroform. The sodium chloride after drying weighed 53 grams, indicating a yield of 91% of theory. The recovered mixed anhydride of acetylsalicylic and propionic acids weighed 230 grams, indicating a yield of 97%. The mixed acid anhydride was recovered from the chloroform by evaporation under vacuum.

The acetylsalicylic-propionic acids mixed anhydride is a waxy solid and effective for topical therapeutic use when five grams is dissolved in 95 grams of a glyceride oil.

EXAMPLE XV

One mol (90 grams) of chemically pure lactic acid was reacted with one mol (40 grams) of sodium hydroxide dissolved in 200 cc. of water. The reaction product was evaporated to dryness and constant weight to produce one mol (112 grams) of sodium lactate. The product was reacted with 78 grams of acetyl chloride dissolved in 400 cc. of diethyl ether for one hour under solvent reflux. The sodium chloride was filtered off and washed with 100 cc. of diethyl ether. The ether was evaporated to recover the mixed acid anhydride product of lactic and acetic acids. The sodium chloride recovered weighed 55 grams, indicating a yield of 95%, and the mixed anhydride recovered weighed 125 grams, indicating a yield of 94%.

Ten grams of the mixed anhydride of lactic and acetic acids in 90 grams of propylene glycol is topically effective for control of infection.

EXAMPLE XVI

One mol of sodium lactate (112 grams) was reacted with one mol of propionyl chloride in diethyl ether to produce sodium chloride and the mixed anhydride of lactic and propionic acids. After completion of the reaction, the sodium chloride was filtered off, washed with diethyl ether, and dried. Fifty-four grams of sodium chloride was recovered, indicating a yield of 93%. After evaporation of the ether under vacuum, 140 grams of the mixed anhydride of lactic and propionic acid was produced, indicating a theoretical yield of 96%.

Ten grams of the mixed anhydride of lactic and propionic acids in 90 grams of propylene glycol is a topically effective medicant.

EXAMPLE XVII

One mol of sodium lactate was reacted with one mol of undecylenoyl chloride in diethyl ether. After separation of the sodium chloride, 240 grams of the mixed anhydride of lactic and undecylenic acids was recovered.

A composition comprising 10 grams of the mixed anhydride of lactic and undecylenic acids in 90 grams of a glyceride oil is therapeutically effective.

EXAMPLE XVIII

One mol of the dihydrate sodium salt of p-aminosalicylic acid (211 grams) was slowly added to one mol of acetyl chloride (78 grams) in 500 cc. of diethyl ether. After one hour stirring under reflux of diethyl ether, the reaction product was filtered and washed with 200 cc. of diethyl ether and 200 cc. benzene. The sodium chloride recovered weighed 50 grams. The combined diethyl ether and benzene filtrates were evaporated under vacuum and mild heating to recover 166 grams of the mixed acid anhydride.

Ten grams of the p-aminosalicylic-acetic acid anhydride dispersed in 90 grams peanut oil is an effective therapeutic agent.

EXAMPLE XIX

One mol of the dihydrate sodium salt of p-aminosalicylic acid (211 grams) was reacted with one mol of undecylenoyl chloride in 500 cc. diethyl ether. After one hour stirring under ether reflux, 200 cc. benzene was added to the reaction mixture and the suspended solid filtered off and washed with 200 cc. of benzene. The sodium chloride recovered weighed 50 grams. The mixed anhydride of p-aminosalicylic and undecylenic acids was recovered by evaporation under vacuum.

Ten grams of the mixed p-aminosalicylic-undecylinic acids anhydride dispersed in a low viscosity petrolatum base is therapeutically effective.

Compositions of this invention are particularly effective against pseudomonas, proteus, and staphylococcus. Both skin and mucosa lesions have been treated by these preparations.

The efficacy of compositions described against various organisms has been demonstrated by specific culture tests, wherein the compositions were applied to spots on the surface of heavily streaked cultures contained on nutrient material in Petri dishes. Observation of an area of inhibition around the added medicament serves as a measure of anti-bacterial effectiveness.

Compositions of this invention are capable of providing therapeutic action at an aqueous wound interface, due to the diffusion of the mixed anhydride materials through the substantially anhydrous vehicle to the tissue interface. Performance in actual therapeutic use and visual evidence as shown by rings of inhibition on culture plates demonstrates this action.

Earlier reference is made to the effect that the exact nature of the mixed anhydride influences the specific applicability of the material. In illustration of this point, tests were made demonstrating that at equal amounts of total material used to control bacterial growth, a preparation containing 40% concentration of the stearic-acetic acid mixed anhydride was equivalent to a 5% concentration of the nonoic-acetic acid anhydride, and to a 5% concentration of the octanoic-acetic acid anhydride material. In this same test, the 5% heptanoic-acetic acid anhydride preparation was substantially more effective (as observed in the 24 hour period of incubation) indicating the probable more rapid diffusion of the smaller molecule to the aqueous interface.

On a weight-percent basis, compositions comprising the mixed anhydride of benzoic acids and acetic acids are approximately as effective as pure acetic acid. Thus, since the mixed anhydride can be tolerated as highly concentrated material, whereas the allowable concentration of aqueous acetic acid is of the order of 4% at the tissue interface, the range of applicability of the former is much broader. Also, the bacteriostatic nature of each acid comprising the mixed anhydride contributes individually to the control of bacteria and other infectious agents.

Having set forth the invention, I claim:

1. A method for the promotion of epithelialization by the control of bacterial action with a substantially anhydrous composition, consisting of an acid anhydride component selected from the group of the formula $$CH_3(CH_2)_mCOOCO(CH_2)_nCH_3$$

where $m$ and $n$ may be varied between 0 and 16, but are never equal to one another in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

2. A method for the promotion of epithelialization by the control of bacterial action with a substantially anhydrous composition of claim 1 in which the acid anhydride component is the mixed anhydride of propionic and acetic acids.

3. A method for the promotion of epithelialization by the control of bacterial action with a substantially anhydrous composition of claim 1, in which the acid anhydride component is the mixed anhydride of heptanoic and acetic acids.

4. A method for the promotion of epithelialization by the control of bacterial action with a substantially anhydrous composition of claim 1, in which the acid anhydride component is the mixed anhydride of octanoic and acetic acids.

5. A method for the promotion of epithelialization by the control of bacterial action with a substantially anhydrous composition of claim 1, in which the acid anhydride component is the mixed anhydride of nonoic and acetic acids.

6. A method for the promotion of epithelialization by the control of bacterial action with a substantially anhydrous composition of claim 1, in which the acid anhydride component is the mixed anhydride of stearic and acetic acids.

7. A method for the promotion of epithelialization by the control of bacterial action with a substantially anhydrous composition consisting of an acid anhydride component selected from the group of the formula $$CH_2=CH(CH_2)_mCOOCO(CH_2)_nCH_3$$

and isomers thereof, where $m$ and $n$ may be varied from 0 to 16 in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

8. A method for the promotion of epithelialization by the control of bacterial action with a substantially anhydrous composition of claim 7, in which the acid anhydride component is the mixed anhydride of undecylenic and acetic acids.

9. A method for the promotion of epithelialization by the control of bacterial action with a substantially anhydrous composition of claim 7, in which the acid anhydride component is the mixed anhydride of undecylenic and propionic acids.

10. A method for the promotion of epithelialization by the control of bacterial action with a substantially anhydrous composition consisting of an acid anhydride component selected from the group of mixed anhydrides of benzoic acid and aliphatic carboxylic acids having between 2 and 18 carbon atoms in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

11. A method for the promotion of epithelialization by the control of bacterial action with a substantially anhydrous composition in claim 10, in which the acid anhydride component is the mixed anhydride of benzoic and undecylenic acids.

12. A method for the promotion of epithelialization by the control of bacterial action with a substantially anhydrous composition of claim 10, in which the acid anhydride component is the mixed anhydride of benzoic and acetic acids.

13. A method for the promotion of epithelialization by the control of bacterial action with a substantially anhydrous composition of claim 10, in which the acid anhydride component is the mixed anhydride of benzoic and propionic acids.

14. A method for the promotion of epithelialization by the control of bacterial action with a substantially anhydrous composition in claim 10, in which the acid anhydride component is the mixed anhydride of benzoic and stearic acids.

15. A method for the promotion of epithelialization by the control of bacterial action with a substantially anhydrous composition consisting of an acid anhydride component selected from the group of the amino-substituted benzoic acid mixed anhydrides with aliphatic carboxylic acids, having between 2 and 18 carbon atoms, in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

16. A method for the promotion of epithelialization by the control of bacterial action with a substantially anhydrous composition consisting of an acid anhydride component selected from the group of the acetyl salicylic acid mixed anhydrides with aliphatic carboxylic acids having between 2 and 18 carbon atoms, in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at the tissue interface.

17. A method for the promotion of epithelialization by the control of bacterial action with a substantially anhydrous composition of claim 16, in which the acid anhydride component is the mixed anhydride of acetyl salicylic acid and acetic acid.

18. A method for the promotion of epithelialization by the control of bacterial action with a substantially anhydrous composition of claim 16, in which the acid anhydride component is the mixed anhydride of acetyl salicylic acid and propionic acid.

19. A method for the promotion of epithelialization by the control of bacterial action with a substantially anhydrous composition consisting of an acid anhydride component selected from the group of the formula

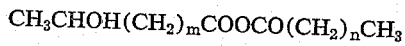

where $m$ and $n$ can vary from 0 to 16, in a non-aqueous solvent selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

20. A method for the promotion of epithelialization by the control of bacterial action with a substantially anhydrous composition consisting of an acid anhydride component selected from the group of the aminosalicylic acid carboxylic mixed acid anhydrides in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

21. A method for the promotion of epithelialization by the control of bacterial action with a substantially anhydrous composition of claim 20, in which the acid anhydride component is the mixed anhydride of p-aminosalicylic and undecylenic acids.

22. A method for the promotion of epithelialization by the control of bacterial action with a substantially anhydrous composition of claim 20 in which the acid anhydride component is the mixed anhydride of p-aminosalicyclic and acetic acids.

23. A method for the promotion of epithelialization by the control of bacterial action with a substantially anhydrous composition consisting of an acid anhydride component selected from the group of the mono hydroxy benzoic acid mixed anhydrides with aliphatic carboxylic acids having between 2 and 18 carbon atoms, in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

24. A method for the promotion of epithelialization by the control of bacterial action with a substantially anhydrous composition of claim 23 in which the acid anhydride component is the mixed anhydride of salicylic and undecylenic acids.

25. A method for the promotion of epithelialization by the control of bacterial action with a substantially anhydrous composition consisting of the mixed anhydride of salicylic and acetic acids in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

26. A method for the promotion of epithelialization by the control of bacterial action with a substantially anhydrous composition consisting of the mixed anhydride of salicylic and propionic acids in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

27. A method for the promotion of epithelialization by the control of bacterial action with a substantially anhydrous composition consisting of the mixed anhydride of para-amino benzoic and acetic acids in a non-aqueous solvent vehicle selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

28. A method for the promotion of epithelialization by the control of bacterial action with a substantially anhydrous composition consisting of the mixed anhydride of lactic and acetic acids, in a non-aqueous solvent selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

29. A method for the promotion of epithelialization by the control of bacterial action with a substantially anhydrous composition consisting of the mixed anhydride of lactic and propionic acids in a non-aqueous solvent selected from the group consisting of glyceride oils, propylene glycols, polyethylene glycols, silicone oils, petrolatum, and mixtures thereof, the anhydride component being present in proportions from 0.5% to substantially 100% by weight, so as to produce therapeutic action at tissue interface.

References Cited
UNITED STATES PATENTS 2,782,216   2/1957   Hayes et al. _____ 260—424

FOREIGN PATENTS 1,263,913   5/1961   France.

ALBERT T. MEYERS, *Primary Examiner.*

JULIAN S. LEVITT, *Examiner.*

DALE R. MAHANAND, *Assistant Examiner.*